April 15, 1924.  H. M. ROBERTSON  1,490,433
TUNNEL KILN
Original Filed July 24, 1920
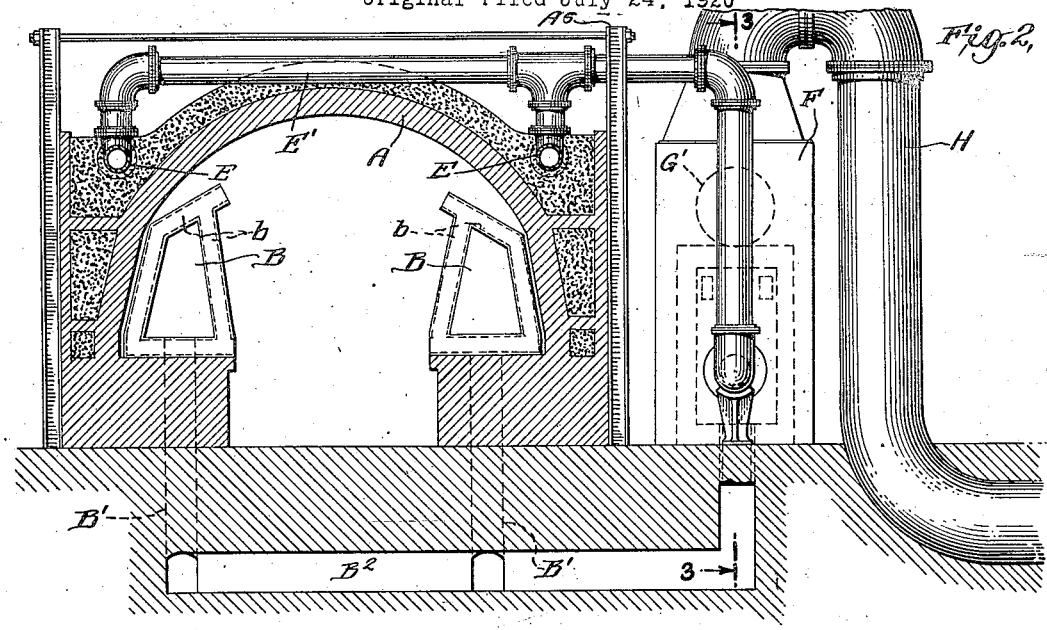
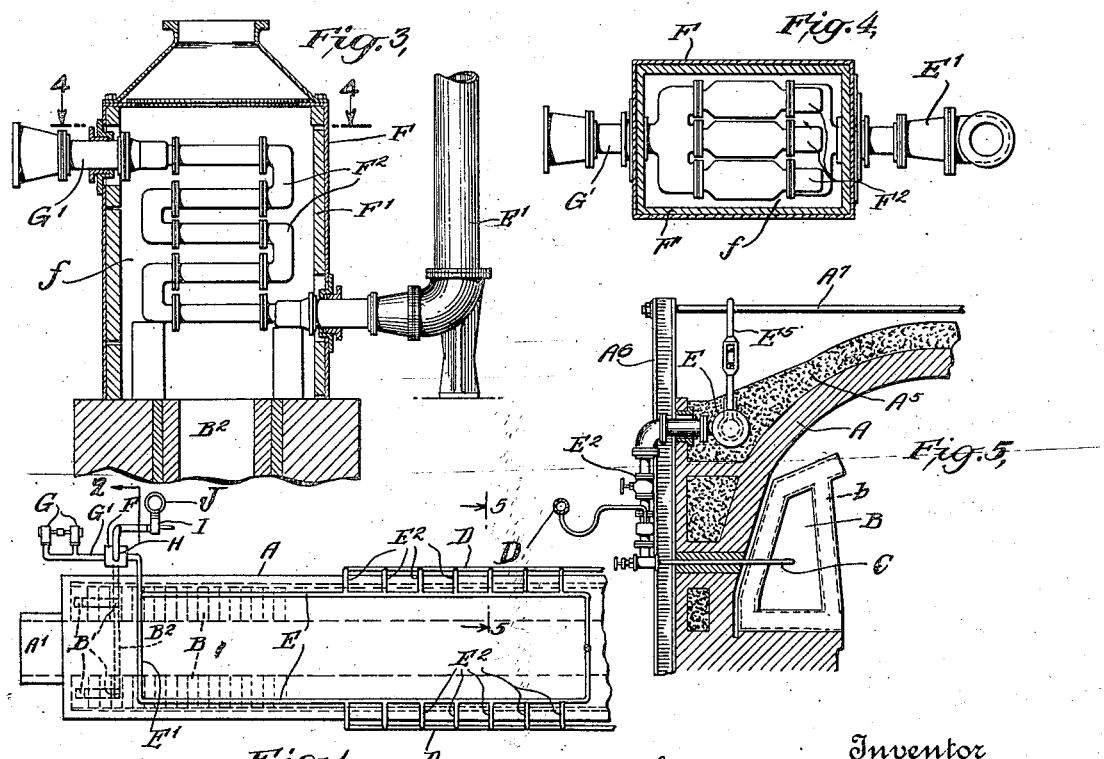
Inventor
Harry M. Robertson
By his Attorney
John E. Hubbell Patented Apr. 15, 1924.

1,490,433

UNITED STATES PATENT OFFICE.

HARRY M. ROBERTSON, OF ROCKVILLE, MARYLAND, ASSIGNOR TO AMERICAN DRESSLER TUNNEL KILNS, INC., OF NEW YORK, N. Y., A CORPORATION OF NEW YORK.

TUNNEL KILN.

Application filed July 24, 1920, Serial No. 398,603. Renewed September 12, 1923.

*To all whom it may concern:*

Be it known that I, HARRY M. ROBERTSON, citizen of the United States, and resident of Rockville, in the county of Montgomery and State of Maryland, have invented certain new and useful Improvements in Tunnel Kilns, of which the following is a specification.

The object of my present invention is to provide a simple and effective combination with a continuous tunnel kiln, of an external recuperator to utilize the hot products of combustion withdrawn from the kiln, in preheating air employed to support combustion in the kiln.

The various features of novelty which characterize my invention are pointed out with particularity in the claims annexed to and forming a part of this specification. For a better understanding of the invention, however, reference should be had to the accompanying drawings and descriptive matter in which I have illustrated and described a preferred embodiment of the invention.

Of the drawings;

Fig. 1 is a diagrammatic plan view of a portion of a continuous tunnel kiln embodying my invention;

Fig. 2 is an elevation in section on the line 2—2 of Fig. 1;

Fig. 3 is a section on the line 3—3 of Fig. 2;

Fig. 4 is a plan view of the recuperator; and

Fig. 5 is a partial transverse section taken on the line 5—5 of Fig. 1.

In the drawings I have illustrated the use of my invention in connection with a continuous tunnel kiln A, having combustion chambers B located therein at opposite sides of the pathway through the kiln for the goods to be heated. The chambers B are formed with channels $b$ in their walls whereby a directed convection current circulation of the kiln atmosphere is maintained as set forth in the patent to Conrad Dressler No. 1,170,428.

As shown the outlet ends of the combustion chambers B extend to the entrance end of the kiln. Each combustion chamber is provided with a series of burner inlets C located at intervals along the length of a portion of the combustion chamber remote from the entrance end of the kiln. Fuel gas or oil is supplied to each burner inlet from fuel supply mains D, and air for the combustion of the fuel is supplied to each burner inlet through a corresponding branch pipe $E^2$ from an air main E. As shown there are two air mains E located above the roof of the kiln chamber and extending longitudinally of the latter one adjacent each side of the kiln. Adjacent the entrance end of the kiln the two mains E are connected to a crossover main E' running to the hot air outlet of a recuperator F.

The recuperator F, in the form shown, comprises a vertically elongated chamber $f$ having a metallic outer wall and a refractory heat insulating lining F'. Within the recuperator chamber $f$ is located a series of iron pipe convolutions $F^2$ connected at their lower end through a manifold to the crossover main E'. At their upper ends the pipes $F^2$ are connected through a manifold to the delivery pipe G' from one or more blowers G, two being shown, for forcing atmospheric air through the pipes $F^2$ and thence through the mains E' and E and the branch pipes $E^2$ to the burner inlets C.

The products of combustion pass out of the combustion chambers B through outlet passages B' into a duct $B^2$ which opens to the recuperator chamber $f$ at the lower end of the latter. To the upper end of the recuperator chamber $f$ is connected a waste gas outlet pipe H which runs to a suitable draft creating device. As shown the draft creating means comprises an exhaust fan I with its outlet connected to a stack J.

Advantageously, as shown, the mains E are embedded in the kieselguhr or like heat insulating cover for the brick inner wall of the kiln, one main E being located above each of the haunch walls by which the kiln arch is supported. Preferably the mains E are not directly supported by the brick walls of the kiln, but are held out of contact with the latter by supports, shown as hangers, each comprising a turn buckle $E^5$, suspended from the rods $A^7$ connecting the upper ends of the usual buckstays $A^6$ supporting the outer brick walls of the kiln. With this arrangement of the supporting mains E, the relative contraction and expansion of the mains and the masonry work of the kiln may occur without creating trouble while a convenient disposition of the mains is obtained and they are effectively insulated against heat losses with practically no additional expense for such insulation. The general arrangement of the recuperator and the kiln is one which lends to economy in ground space occupied and in construction cost, as well as to an efficient heat recovery. It will be apparent that in operation the recuperator acts on the counterflow principle, and that the flow resistance to the passage of the hot products through the recuperator is relatively small, thus making it easy to maintain the proper draft suction at the outlets of the combustion chambers. The invention is especially adapted for use in connection with a tunnel kiln of the type shown in which, as in annealing casting iron, it is desirable in order to shorten the length of the kiln, or for other reasons to have the entrance end of the kiln quite hot, so that the products of combustion are withdrawn from the kiln at a relatively high temperature.

While in accordance with the provisions of the statutes I have illustrated and described the preferred embodiment of my invention now known to me, it will be apparent to those skilled in the art that changes may be made in the form of the apparatus disclosed herein without departing from the spirit of my invention and that certain features of my invention may sometimes be used to advantage without a corresponding use of other features.

Having now described my invention, what I claim as new and desire to secure by Letters Patent, is:

1. The combination with a continuous tunnel kiln having an outlet for products of combustion adjacent its entrance end and a burner inlet at a point remote from the entrance end of the kiln, of a recuperator connected to said outlet and a conduit for passing air preheated in said recuperator to said burner inlet comprising a portion extending longitudinally of said kiln and located above the latter.

2. The combination with a continuous tunnel kiln comprising a kiln chamber with a masonry wall and a heat insulating cover for the latter and having an outlet for products of combustion adjacent its entrance end and burner inlets at the sides of the kiln at points remote from the entrance end thereof, of a recuperator connected to said outlet and a conduit system for conveying air preheated in said recuperator to said burner inlets comprising a portion extending longitudinally of said kiln and embedded in said insulation cover.

3. The combination in a continuous tunnel kiln comprising an elongated kiln chamber formed with masonry walls and having burner inlets and a metallic reinforcing structure therefor comprising buckstays at the sides of the kiln and tie rods connecting buckstays at opposite sides of the kiln, of an air supply conduit system including a portion extending longitudinally of the kiln and supported by said structure and comprising outlet connections opening to said burner inlets.

4. The combination in a continuous tunnel kiln comprising an elongated kiln chamber formed with masonry walls and having burner inlets and an insulating cover, and a metallic reinforcing structure for said walls comprising buckstays at the sides of the kiln and tie rods connecting buckstays at opposite sides of the kiln, of an air supply conduit system including a portion extending longitudinally of the kiln and embedded in said insulation and comprising outlet connections to said burner inlets, and adjustable hangers by which said conduit portion is suspended from said tie rods.

Signed at New Castle, in the county of Lawrence and State of Pennsylvania, this 15th day of July, A. D. 1920.

H. M. ROBERTSON.